United States Patent
Wang et al.

(10) Patent No.: US 6,671,786 B2
(45) Date of Patent: Dec. 30, 2003

(54) SYSTEM AND METHOD FOR MIRRORING MEMORY WITH RESTRICTED ACCESS TO MAIN PHYSICAL MIRRORED MEMORY

(75) Inventors: Landy Wang, Redmond, WA (US); John D. Vert, Seattle, WA (US)

(73) Assignee: Microsoft Corporation, Redmond, WA (US)

(*) Notice: Subject to any disclaimer, the term of this patent is extended or adjusted under 35 U.S.C. 154(b) by 357 days.

(21) Appl. No.: 09/876,761

(22) Filed: Jun. 7, 2001

(65) Prior Publication Data

US 2002/0188815 A1 Dec. 12, 2002

(51) Int. Cl.[7] .............................................. G06F 13/00

(52) U.S. Cl. ....................... 711/162; 711/161; 711/163; 711/152; 711/112; 711/114; 711/209; 714/6; 707/200

(58) Field of Search ................................ 711/162, 163, 711/161, 152, 112, 114, 209; 714/6; 707/200

(56) References Cited

U.S. PATENT DOCUMENTS

| | | | | |
|---|---|---|---|---|
| 5,729,710 A | * | 3/1998 | Magee et al. ................ 711/203 |
| 5,784,548 A | * | 7/1998 | Liong et al. .................... 714/6 |
| 5,889,935 A | * | 3/1999 | Ofek et al. ..................... 714/6 |
| 6,009,481 A | * | 12/1999 | Mayer ........................... 710/33 |
| 6,088,815 A | * | 7/2000 | West et al. .................... 714/15 |
| 6,202,136 B1 | * | 3/2001 | Wikle et al. ................. 711/162 |
| 6,216,211 B1 | * | 4/2001 | McBrearty et al. .......... 711/162 |
| 6,295,591 B1 | * | 9/2001 | Bealkowski et al. ......... 711/165 |
| 6,477,612 B1 | * | 11/2002 | Wang ............................. 711/2 |
| 6,484,173 B1 | * | 11/2002 | O'Hare et al. ................. 707/9 |

OTHER PUBLICATIONS

Chen et al., "The Rio File Cache: Surviving Operating System Crashes," pp. 74–83, ACM, Oct. 1996.*
Kim, "Highly Available Systems for Database Applications," pp. 71–98, ACM, Mar. 1984.*
Borr et al., "High Performance SQL Through Low-Level System Integration," pp. 342–349, ACM, 1988.*
Chen et al., "Raid: High-Performance, Reliable Secondary Storage," pp. 145–185, Jun. 1994.*
Rosenberg et al., "Stability in a Persistent Store Based on a Large Virtual Memory," pp. 229–245, Security and Persistence, Springer–Verlag, 1990.*

(List continued on next page.)

Primary Examiner—Matthew Kim
Assistant Examiner—Stephen C Elmore
(74) Attorney, Agent, or Firm—Merchant & Gould P.C.

(57) ABSTRACT

The present invention includes a method of mirroring memory that reduces the down time for copying information from one physical memory subsystem to a redundant physical memory subsystem by separating the mirroring process into phases. The first phase copies information from the first physical memory subsystem to the redundant physical memory subsystem. During the first phase, applications are not restricted from accessing the first memory subsystem while the first phase of the memory mirroring operation copies the information. The second phase of the memory mirroring operation copies active information to the redundant physical memory subsystem. The active information includes information that was not copied during the first phase and information that changed during the first phase. During the second phase, applications are restricted from accessing the first physical memory subsystem. Because the second phase typically copies a smaller amount of information than the first phase, the down time associated with mirroring the memory is minimal.

20 Claims, 9 Drawing Sheets

OTHER PUBLICATIONS

"No Failures with Non–Stop System (Tandem 16);" *Data Processing* 21:9 (Oct. 1979), pp. 32–33.

Powell, A., "Dixons Focuses on Automation;" *Computerised Manufacturing*, (Jul.–Aug. 1987), pp. 30–31.

Borg, A. et al., "Fault Tolerance Under UNIX;" *ACM Trans. Comput. Syst.* 7:1 (Feb. 1989), pp. 1–24.

Yamamoto, M. et al., "High–Reliability Operating System ACOS–4/XVP;" *NEC Research & Development* 35:1, 1994, pp. 89–95.

Lee, Y.B. et al., "Storage Rebuild for Automatic Failure Recovery in Video–on–Demand Servers;" *Proceedings of 1997 IEEE International Symposium on Consumer Electronics*, 1997, pp. 258–261.

Kugler, A., "IMEM: An Intelligent Memory for Bump–and–Reflection–Mapping;" *Proceedings of the 1998 Eurographics/Siggraph Workshop on Graphics Hardware*, 1998, p. 113–122.

Shimamura, K. et al., "A Triple Redundant Controller which Adopts the Time–Sharing Fault Recovery Method and Its Application to a Power Converter Controller;" *IEEE Proceedings of the Fourth Real–Time Technology and Applications Symposium*, 1998, pp. 210–219.

Zhou, Y. et al., "Fast Cluster Failover Using Virtual Memory–Mapped Communication;" *Proceedings of the 13$^{th}$ Association for Computer Machinery International Conference on Supercomputing*, 1999, pp. 373–382.

* cited by examiner

SYSTEM AND METHOD FOR MIRRORING MEMORY WITH RESTRICTED ACCESS TO MAIN PHYSICAL MIRRORED MEMORY

TECHNICAL FIELD

The present invention relates to fault tolerant computer systems having redundant memory subsystems. More particularly, the present invention relates to the mirroring of information on one memory subsystem to another memory subsystem.

BACKGROUND OF THE INVENTION

Many businesses cannot tolerate having their computer systems unavailable (i.e., "down") for even a small amount of time. Examples of such businesses include call centers, order entry systems, financial transaction tracking systems, telecomm servers, process control servers in critical environments (e.g., chemical plants, foundries, traffic control systems) and other such businesses. Typically, these businesses use computer systems having a large number of hardware components, which only increases the likelihood that one of the components will fail and the computer system will become unavailable. For example, if a 4 giga-byte random access memory (RAM) has a mean time between failure (MTBF) in years, increasing the amount of RAM to 64 gigabytes may decrease the MTBF to just a few months.

In order to accommodate the demands of these businesses, computer manufacturers have designed computer systems that are fault tolerant, also known as continuously available systems. Typically, these fault tolerant systems include fault tolerant hardware having mirrored components that can be individually removed, replaced or re-synchronized without requiring a long down time. One of the components that is frequently mirrored is the memory.

However, there is an inherent problem with mirroring memory when applications are continuously using the memory. The problem is that correctly copying information residing in the memory causes a visible interruption to the applications. For example, some fault tolerant computer system with memory mirroring functionality prevent access to the memory while the information in one memory component is copied to the mirrored memory component. As one can imagine, the down time increases significantly as the amount of memory increases. Another problem is that because the access to the memory is so intertwined with the operating system, the fault tolerant computer systems are typically designed for a specific business application or for a specific hardware configuration. Thus, the cost of purchasing a fault tolerant computer system with the memory mirroring functionality is drastically increased.

SUMMARY OF THE INVENTION

Briefly described, the present invention includes a method of mirroring memory that reduces the down time for copying information from one physical memory subsystem to a redundant physical memory subsystem by separating the mirroring process into phases. One phase allows applications to access the memory and another phases restricts applications from accessing the memory. Thus, by striving to maximize the amount of information mirrored during the first phase, the present invention provides a method of mirroring memory having an acceptable down time for many businesses. The first phase copies information from the first physical memory subsystem to the redundant physical memory subsystem. During the first phase, applications are not restricted from accessing the first memory subsystem while the first phase of the memory mirroring operation copies the information. Thus, the first phase is relatively transparent to running applications. Also, the first phase is designed to copy an optimal amount of the information, if possible. The second phase of the memory mirroring operation copies active information to the redundant physical memory subsystem. The active information includes information that was not copied during the first phase and information that changed during the first phase. During the second phase, applications are restricted from accessing the first physical memory subsystem. However, because the second phase typically copies a smaller amount of information than the first phase, the down time associated with the second phase is minimal.

DETAILED DESCRIPTION OF THE PREFERRED EMBODIMENT

Illustrative Operating Environment

Figure 1:
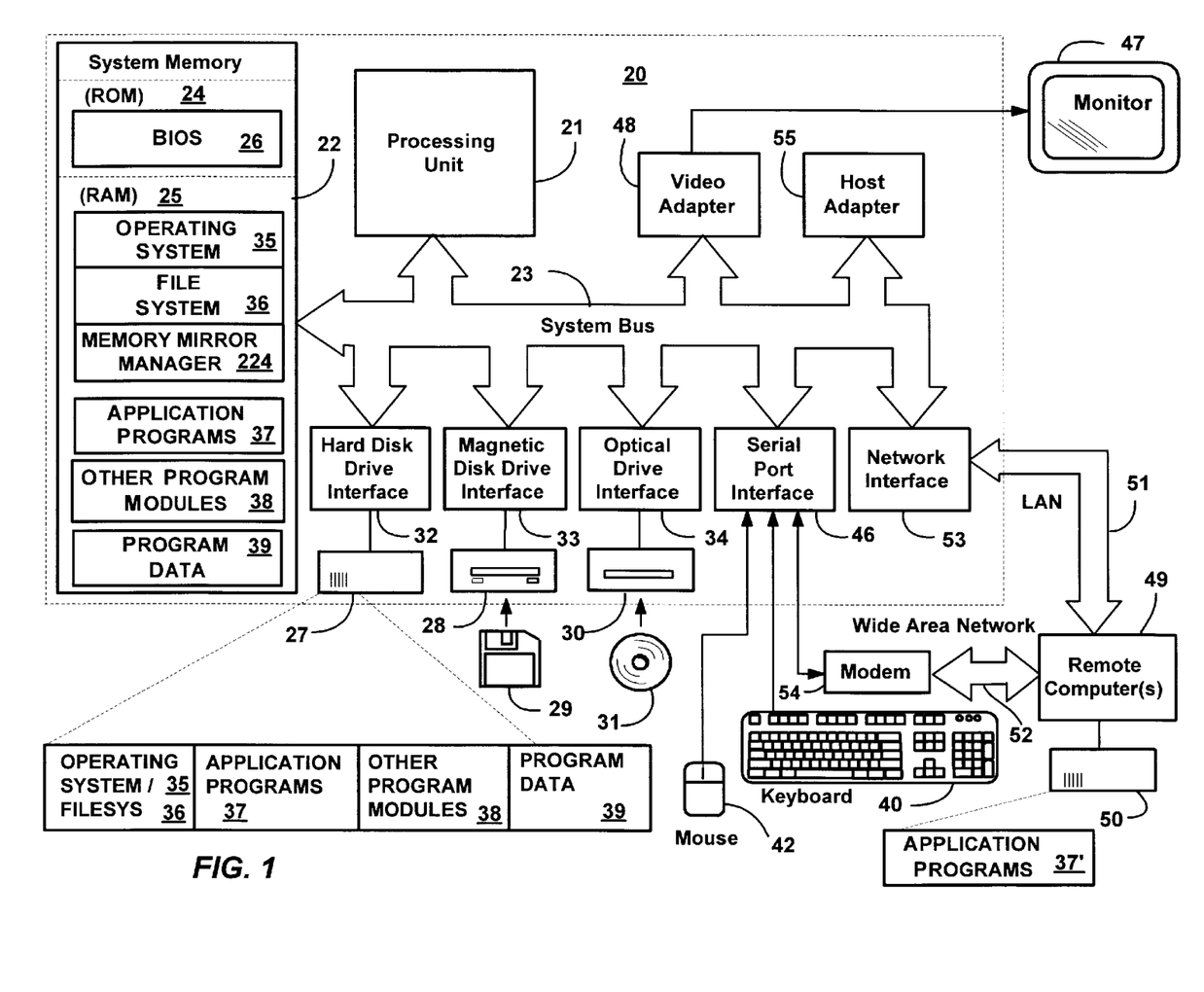
FIG. 1 illustrates an exemplary computing environment that may be adapted to implement one embodiment of the present invention.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. On a memory mirroring system, as described herein, RAM 25 may include a main physical memory subsystem and a redundant physical memory subsystem. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (such as Microsoft Corporation's Windows® 2000, operating system). The computer 20 includes a file system 36 associated with or included within the operating system 35, such as the Windows NT® File System (NTFS), one or more application programs 37, other program modules 38 and program data 39. On a memory mirroring system, as described herein, a memory mirror manager (not shown), along with associated memory mirror data structures (not shown), are associated with or included within the operating system 35.

A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

While the present invention is primarily described with respect to the Windows® 2000 operating system, those skilled in the art will appreciate that other operating systems and/or file systems may implement and benefit from the present invention.

Illustrative Memory Mirroring System

Figure 2:
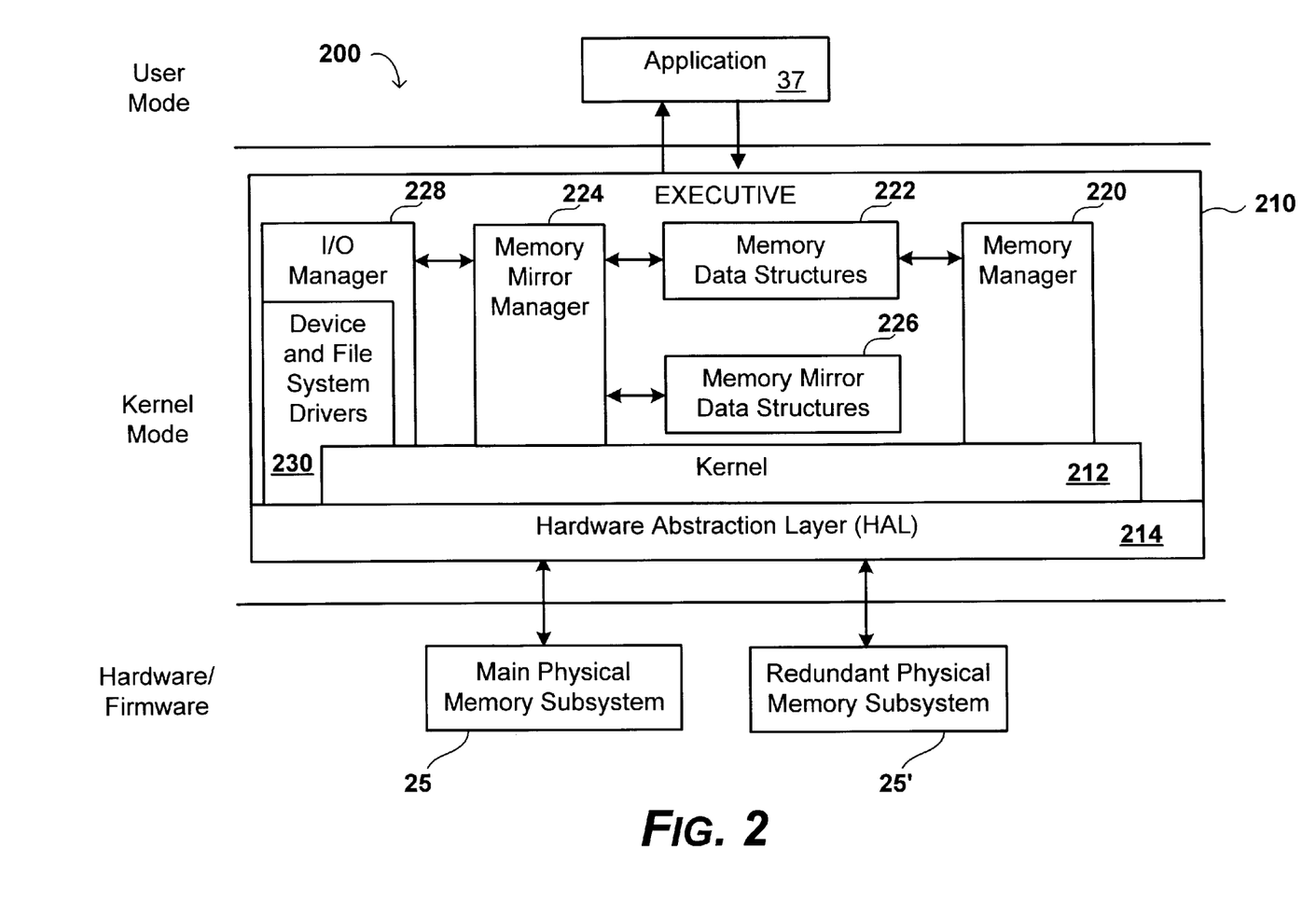
FIG. 2 is a functional block diagram of one exemplary memory mirroring system as implemented in the computer system shown in FIG. 1.

FIG. 2 is a functional block diagram of one exemplary memory mirroring system 200 which may be implemented in the computer system 20 shown in FIG. 1. The memory mirroring system 200 includes an application 37, an executive 210, a kernel 212, a hardware abstraction layer (HAL) 214 and physical memory subsystems (i.e., a main physical memory subsystem 25 and a redundant physical memory subsystem 25'). The application programs 37 may interface with the executive 210 through application programming interfaces (APIs) callable from within a user mode. As one skilled in the art of operating system architecture will appreciate, the executive 210 typically provides several operating system services, such as process and thread management, security, interprocess communication and other services, to the application 37. The operating system services provided by the executive and pertinent to the present invention include a memory manager 220, a memory mirror manager 224, an I/O manager 228 and a device and file system driver 230, shown in FIG. 2. While the memory mirror manager 224 is shown separate from the memory manager 220, one skilled in the art will appreciate that the functionality provided by the memory mirror manager 224 may be incorporated within the memory manager 220 or other component without departing from the scope of the present invention. These operating system services are typically executed within a kernel mode.

The memory mirror manager 224, in accordance with the present invention, cooperates with the memory manager 220, the I/O manager 228, the device and file system driver 230, the kernel 212, and the hardware abstraction layer 214 to manage the copying of information resident on the main physical memory subsystem 25 to the redundant physical memory subsystem 25' without causing a significant downtime for the application 37. In the illustrative embodiment described below, certain aspects of the components of the memory mirroring system, such as the memory manager 220, the input/output (I/O) manager 228, the device and file system drivers 230, the kernel 212 and the hardware abstraction layer (HAL) 214 are known in the art. The following discussion provides a brief overview of these aspects, along with a detailed discussion of aspects relevant to the present invention, in order to describe the components to the extent necessary to understand the present invention. Additional information on these components may be found in the book entitled *Inside Microsoft® Windows® 2000, Third Edition*, by D. A. Solomon and M. E. Russinovich.

Briefly, the kernel 212 provides fundamental mechanisms used by the components in the executive 210 and low-level hardware support, such as interrupt and exception dispatching. The low-level hardware support varies with the type of processing unit 21 in the system 20. The kernel 212 is designed to isolate the executive 210 and the device drivers 230 from variations between the hardware architectures. The hardware abstraction layer (HAL) 214 aids in isolating the executive 210 and the device drivers 230 from variations between the hardware architectures. HAL 214 may be implemented as a loadable kernel-mode module. HAL 214 is responsible for hiding hardware-dependent details, such as I/O interfaces, interrupt controllers, and other architecture-specific and machine dependent functions from the executive 210.

The memory manager 220 implements a memory scheme that provides a large private address space for processes. The large private address space is referred to as virtual memory. The memory manager 220 manages the virtual memory by swapping virtual memory in and out of a physical memory 25, such as RAM, from non-volatile memory, such as disk 27. The subset of a process's virtual address space that is physically resident in RAM is called a working set. The memory manager 220 maintains information regarding the working sets and memory stored in non-volatile memory by using memory data structures 222 (shown in FIG. 2). Thus, the memory manager 220 is able to manage virtual memory that exceeds the available physical memory on the system 20.

The I/O manager 228 connects applications 37 and operating system components to virtual, logical, and physical devices by implementing device-dependent I/O for any device connected to the system 20. The I/O manager 228 communicates with the appropriate device driver 230 and dispatches I/O operations to the appropriate device driver for further processing.

Now, in accordance with the present invention, the memory mirror manager 224, associated with or included within the executive 210, manages the copying of information resident in the main physical memory subsystem 25 to a redundant physical memory subsystem 25'. As mentioned earlier, in order to minimize the impact to applications 37, the present invention implements a memory mirroring operation that copies the information stored on the main physical memory subsystem 25 to the redundant physical memory subsystem 25' with minimal visible interruption to the applications 37. Briefly, the memory mirror manager 224, illustrated by flow diagrams in FIGS. 7–9 and described below, ascertains information about the working sets maintained in the main physical memory subsystem 25 by communicating with the memory manager 220 and accessing the memory data structures 222. Using this information about the working sets, the memory mirror manager 224 issues copy requests to the I/O manager 228. The copy requests specify the information resident on the main physical memory subsystem 25 that should be copied to the redundant physical memory subsystem 25'. The memory mirror manager 224 orchestrates these copy requests by maintaining relevant data in memory mirror data structures 226, illustrated in FIGS. 4 and 5 and described below.

Figure 3:
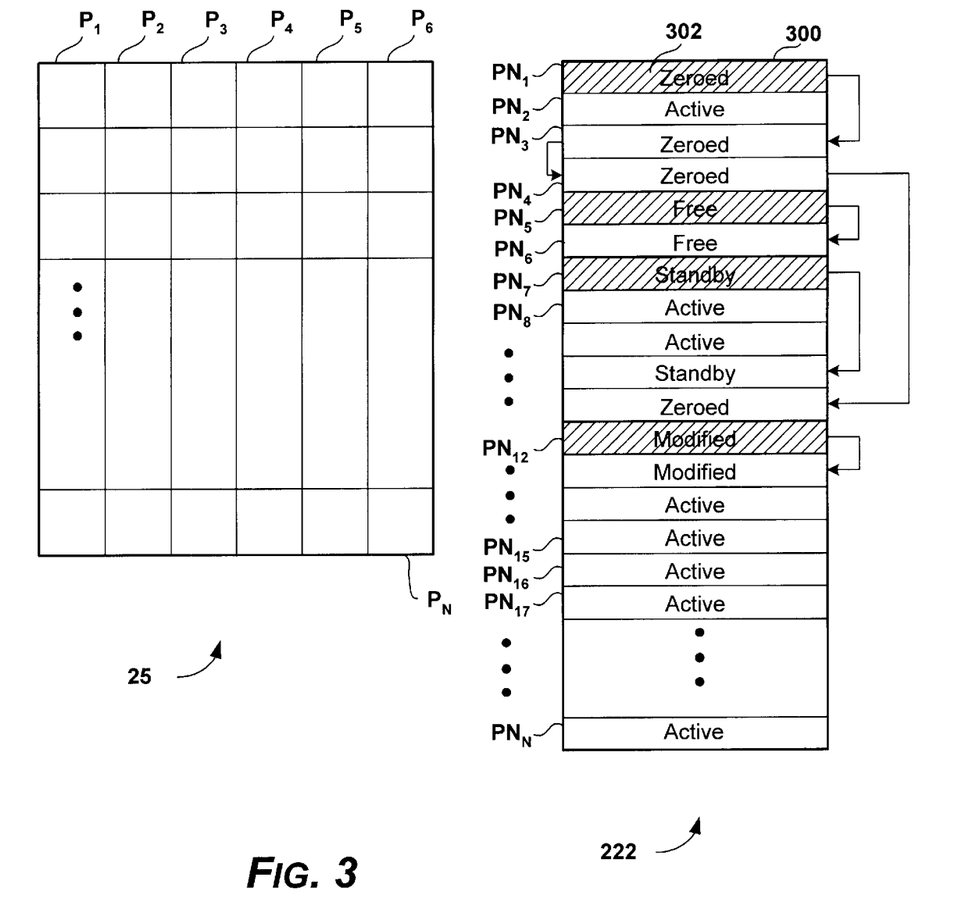
FIG. 3 is a graphical representation of one possible layout of the physical memory subsystem shown in FIG. 2 and a corresponding database that represents one of the memory data structures shown in FIG. 2.

FIG. 3 is a graphical representation of one possible layout for the main physical memory subsystem 25. The main physical memory subsystem 25 is illustrated having a plurality of pages $P_1$–$P_N$. In one illustrative example, each page P contains 4096 bytes. Thus, assuming the physical memory is 128 Kbytes, there would be thirty-two pages $P_1$–$P_{32}$. As mentioned earlier, each page P contains a portion of the working set for one of the processes that are managed by the memory manager. The memory manager may swap each page P out of the physical memory to non-volatile memory at some time while managing the virtual memory. The redundant physical memory subsystem 25' will have a layout similar to the layout for the main physical memory subsystem 25. However, it is possible that the redundant physical memory subsystem 25' may be larger than the main physical memory subsystem 25, but both typically have the same number of bytes in a page P.

FIG. 3 also provides a graphical representation of one embodiment of a page frame number (PFN) database 300 maintained by the memory manager 220 as one of its memory data structures 222. The memory manager maintains several memory data structures 222, one of which is the PFN database 300. The PFN database 300 is used to manage the working sets stored in each page P of the main physical memory subsystem 25. The PFN database 300 includes page number entries $PN_1$–$PN_N$ that correspond to the pages $P_1$–$P_N$ in the main physical memory subsystem 25, respectively. Each page number entry PN stores a page descriptor 302 describing one of several states for the associated page P. The states include active, standby, modified, free and zeroed. An active page refers to a page that is part of a working set or a page that is being used, such as a nonpaged kernel page. A standby page refers to a page that previously belonged to a working set but has been removed. The standby page has not been modified since it was last written to disk. A modified page refers to a page that previously belonged to a working set but has been removed. However, unlike the standby page, the modified page was modified while it was in use and its current contents have not yet been written to disk. Therefore, the modified page must be written to disk before the page P can be reused. A free page refers to a page that is available for use but has unspecified dirty data stored in it. A zeroed page refers to a page that is available for use and has been initialized with zeroes.

In the embodiment illustrated in FIG. 3, zeroed pages, free pages, standby pages and modified pages are organized as linked lists. The first page number entry PN in each linked list is graphically represented by cross-hatching (i.e., $PN_1$ represents the start of a zeroed linked list). Each page number entry PN in the linked lists has an arrow pointing to the next page number entry PN in the linked list, if there is another page P. The linked lists allow the memory manager 220 to quickly locate pages P of a specific state. As one skilled in the art will appreciate, the PFN database 300 may include other fields. However, the other fields are not pertinent to the discussion of the present invention.

Figure 4:
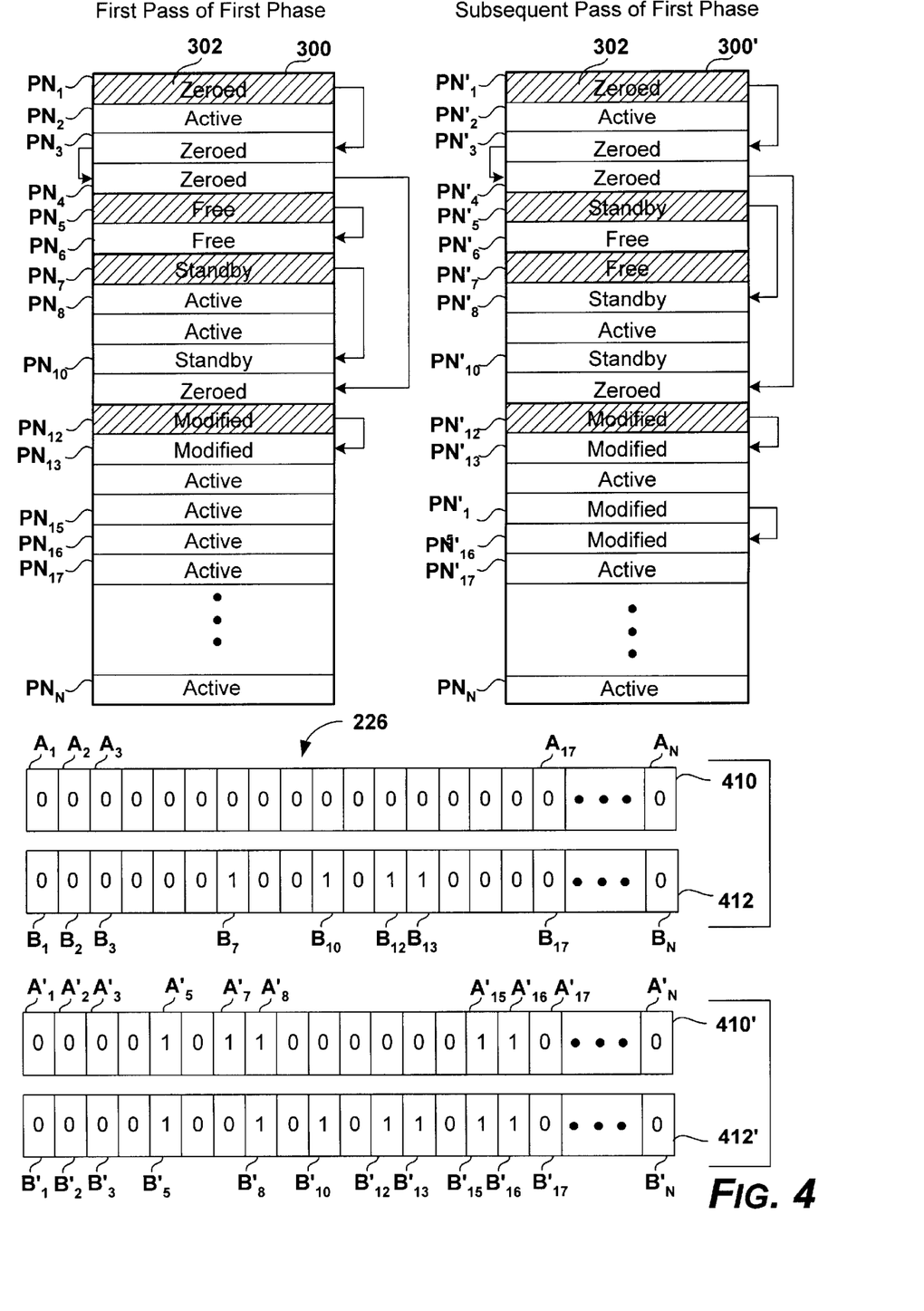
FIG. 4 is a graphical representation of changes to the database during memory mirroring along with corresponding maps that represent the memory mirror data structures shown in FIG. 2.

FIG. 4 is a graphical representation of two page frame number databases 300 and 300'. The PFN database 300 is identical to the PFN database 300 described in FIG. 3 and represents the state of the page number entries $PN_{1-N}$ upon a first pass of a first phase of the memory mirroring operation. PFN database 300' represents the state of the page table entries $PN'_{1-N}$ on one of several subsequent passes of the first phase of the memory mirroring operation, as will be described in detail later. For the following example, PFN database 300' represents the state of the page table entries $PN'_{1-N}$ on the second pass of the first phase. Thus, as shown, page number entry $PN_5$ has changed states during the first pass from a free page to a standby page as indicated in page number entry $PN'_5$. Page number entry $PN_7$ has changed states during the first pass from a standby page to a free page, as indicated in page number entry $PN'_7$. Page number entry $PN_8$ has changed states during the first pass from an active page to a standby page, as indicated in page number entry $PN'_8$. Page number entry $PN_{15}$ has changed states during the first pass from an active page to a modified page, as indicated in page number entry $PN'_{15}$. Page number entry $PN_{16}$ has changed states during the first pass from an active page to a modified page, as indicated in page number entry $PN'_{16}$. The corresponding linked list designations have changed accordingly.

FIG. 4 also illustrates a first map 410 and a second map 412 generated by the memory mirror manager 224 for use during the first phase of the memory mirroring operation. The first map 410 and the second map 412 are included within the memory mirror data structures 226 shown in FIG. 2. In the embodiment illustrated in FIG. 4, the first map 410 is a bitmap having bits $A_{1-N}$ that correspond to the page number entries $PN_{1-N}$, respectively, in PFN database 300. The first map 410' is the first map 410 on a later pass (i.e., the second pass) of the first phase. As is illustrated in the flow diagrams of FIGS. 7–9 and described in the corresponding text, the first map 410 is used by the memory mirror manager 224 to determine the pages P that have changed from one state to a different state during one of the passes in either the first phase or the second phase of the memory mirroring operation. Because the first map 410 illustrated in FIG. 4 is associated with the first pass of the first phase (i.e., start of memory mirroring), all the bits $A_{1-N}$ are in the same state (i.e., 0 or clear) representing that none of the pages P have changed states. However, the first map 410' associated with the second pass of the first phase has bits $A'_5, A'_7, A'_8, A'_{15}$ and $A'_{16}$ set. The set bits $A'_5, A'_7, A'_8, A'_{15}$ and $A'_{16}$ reflect that the corresponding pages $P_5, P_7, P_8, P_{15}$ and $P_{16}$ in the main physical memory subsystem have changed states since the previous pass, as reflected by page number entries $PN'_5, PN'_7, PN'_8, PN'_{15}$ and $PN'_{16}$ of the PFN database 300'.

In the embodiment illustrated in FIG. 4, the second map 412 is a bitmap having bits $B_{1-N}$ that correspond to the page number entries $PN_{1-N}$, respectively. The second map 412' is the second map 412 on a later pass of the first phase (i.e., the second pass). As is illustrated in the flow diagrams of FIGS. 7–9 and described in the corresponding text, the second map 412 is used by the memory mirror manager 224 to determine the pages P that are in a proper state to request the I/O manager 228 to copy the page P to the redundant physical memory subsystem 25'. In one embodiment, the proper states include pages in the modified and/or standby state. The second map 412, illustrated in FIG. 4, has bits $B_7, B_{10}, B_{12}$ and $B_{13}$ set, which indicates that corresponding pages $P_7, P_{10}, P_{12}$ and $P_{13}$ are in the proper state (i.e., either standby and/or modified as reflected in PFN database 300) to request copying. For this embodiment, modified pages and standby pages are considered to be in the proper state. The second map 412' has bits $B'_5, B'_8, B'_{10}, B'_{12}, B'_{13}, B'_{15}$ and $B'_{16}$ set indicating that the corresponding pages $P_5, P_8, P_{10}, P_{12}, P_{13}, P_{15}$ and $P_{16}$ are in the proper state to request copying. Thus, the memory mirror manager is responsible for setting the bits $B_{1-N} B'_{1-N}$ in the second map 412 412' based on the state contained within the corresponding page frame entry $PN_{1-N}$ of the corresponding PFN database 300 300' and the corresponding bit A in the first map, as will be described in detail with reference to FIG. 8.

Figure 5:
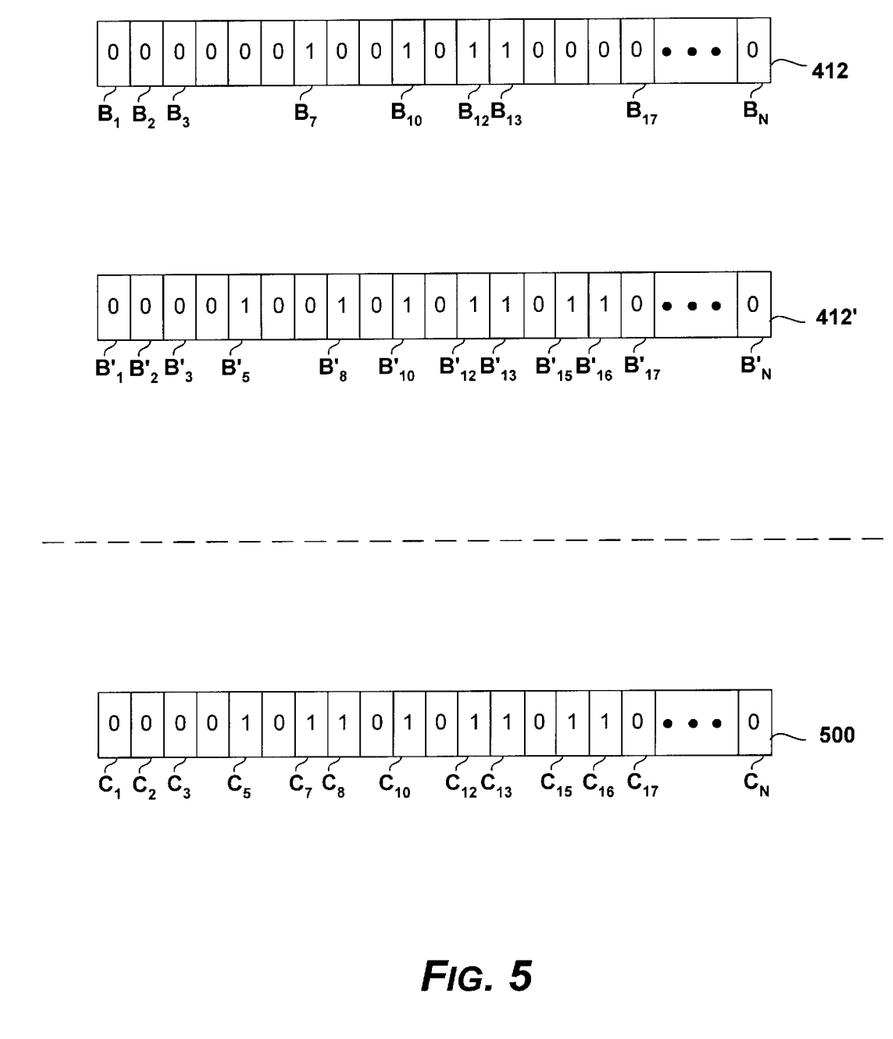
FIG. 5 is a graphical representation of an aggregate map that represents another memory mirror data structure shown in FIG. 2 that is used to verify the memory mirroring operation.
Figure 7:
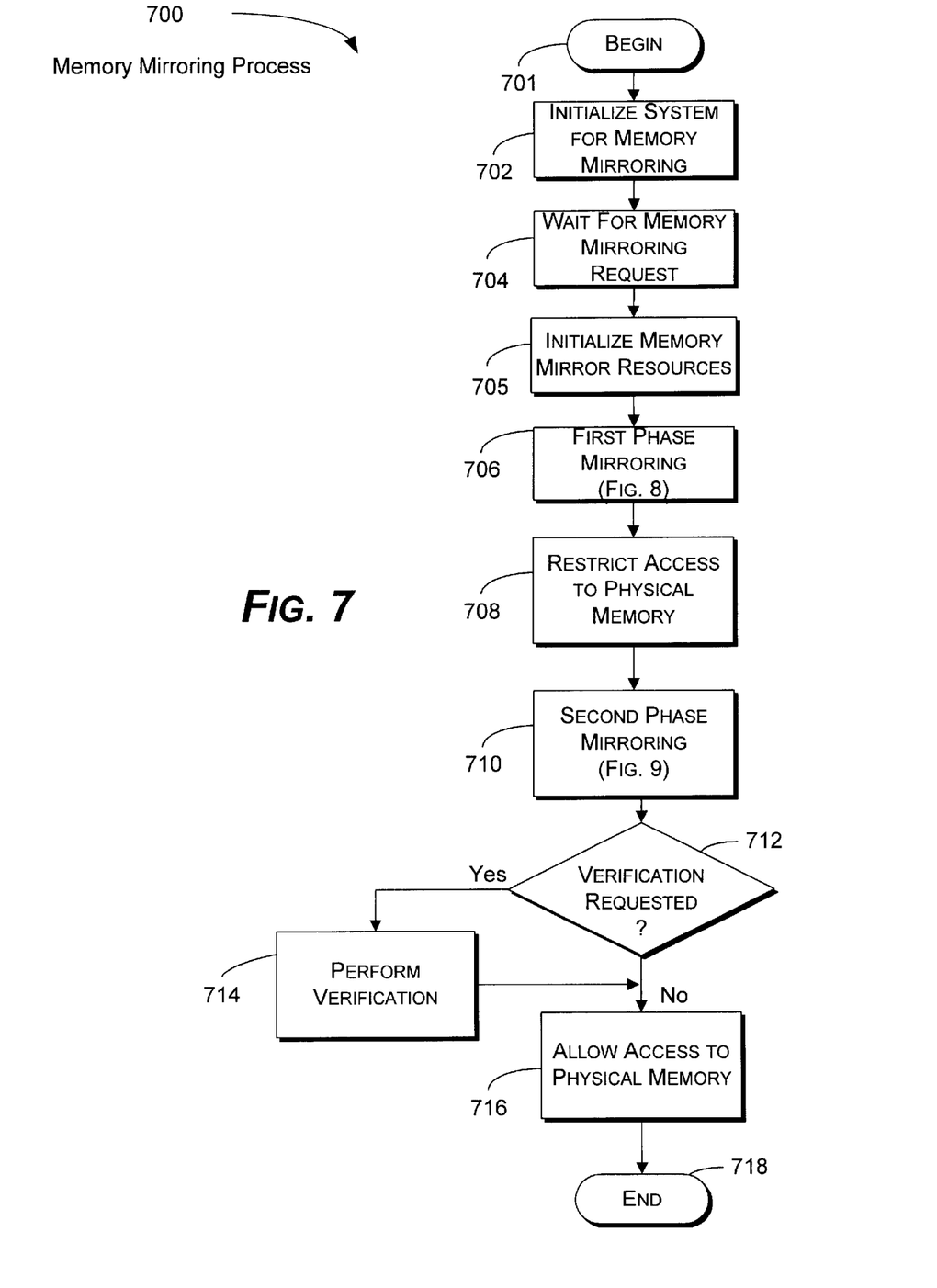
FIG. 7 is a logical flow diagram generally illustrating an overview of a process for mirroring memory.

FIG. 5 is a graphical representation of an aggregate map 500 that represents another memory mirror data structure 226 referred to in FIG. 2. The aggregate map 500 is used to verify the contents of the pages P that were copied from the main physical memory subsystem 25 to the redundant physical memory subsystem 25' after the memory mirroring operation has completed. The memory mirror manager 224 builds the aggregate map using information stored in the second map 412 during each pass of both the first phase and the second phase of the memory mirroring process. In the embodiment, illustrated in FIG. 5, only two passes were completed, so two second maps 412 and 412' are used to create the information stored in the aggregate map 500. The aggregate map 500 is a bitmap having bits $C_{1-N}$ that correspond to bits $B_{1-N}$ of the second map 412. For any bit $B_{1-N}$ that is set in any of the second maps 412, 412', the corresponding bit C is also set. The bits C that are set in the aggregate map 500 then represent the pages that were copied from the main physical memory subsystem 25 to the redundant physical memory subsystem 25' sometime during the memory mirroring process. Thus, as shown in FIG. 7 and described in the corresponding text, the pages P corresponding to the bits C that are set in the aggregate map 300 are compared in the main physical memory subsystem to the corresponding page P in the redundant memory subsystem 25' during a verification process. If the contents of all such corresponding pages P are identical, the verification process is successful. Typically, the aggregate map 500 is used after the copying has been completed and the system is ready to begin using the redundant physical memory subsystem 25'.

Figure 6:
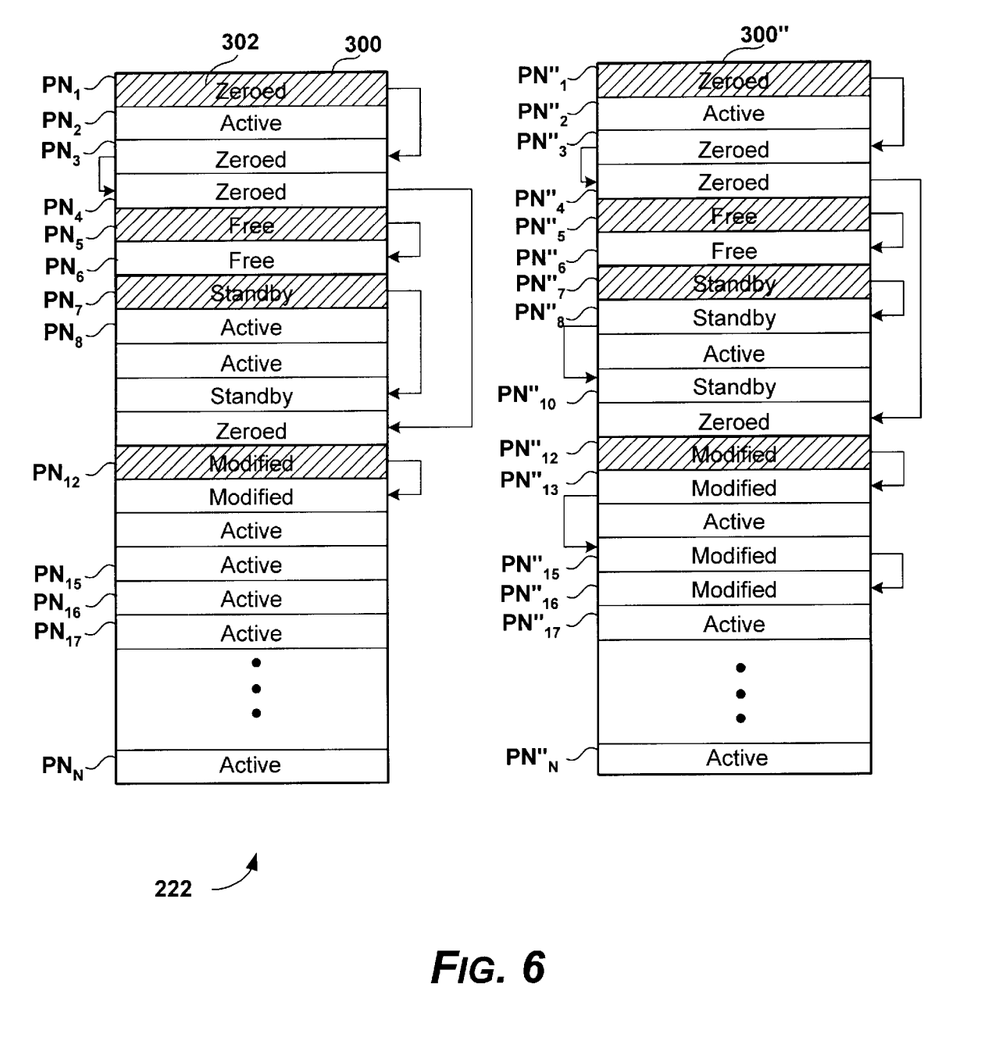
FIG. 6 is a graphical representation of another embodiment of the database illustrating changes to the database during memory mirroring.

FIG. 6 is a graphical representation of two page frame number (PFN) databases 300 and 300". The PFN database 300 is identical to the PFN database 300 described in FIG. 3 and represents the page number entries upon the start of a first pass of a first phase of the data mirroring operation. PFN database 300" represents the page number entries PN" after the memory mirror manager has optimized the PFN database 300 before starting the first pass of the first phase of the data mirroring operation. The PFN database 300 is optimized by attempting to remove all active pages in the PFN database 300 and then to re-categorize the removed active pages into one of the proper states for copying (i.e., standby and/or modified pages), resulting in PFN database 300". The memory mirror manager 224 performs this by trimming all the working sets, thus removing as many pages as possible from active states. The pages removed from the active state then become either standby or modified pages. However, not all the active pages will be able to be re-categorized, such as locked memory pages. In the embodiment illustrated, pages $P_8, P_{15}$, and $P_{16}$ corresponding to page number entries $PN_8, PN_{15}$ and $PN_{16}$ were re-categorized. The corresponding linked list designations have changed accordingly.

FIG. 7 is a logical flow diagram generally illustrating an overview of a memory mirroring process 700, in accordance with one embodiment of the present invention. The memory mirroring process 700 begins at block 701, where the system 20 is beginning its boot process. In general, the boot process loads the kernel and initializes the executive components. The kernel also launches the user-mode portion of the operating system. Processing continues at block 702.

At block 702, the system is initialized for memory mirroring. This initialization includes loading the memory mirror manager. Loading the memory mirror manager may be included within the boot process or may have an independent boot process. The memory mirror manager may also be included within one of the other components of the executive, such as the memory manager, and loaded as part of that component. In an illustrative embodiment, in which the operating system is the Microsoft Corporation's Windows® 2000 operating system, loading the memory mirror manager may include storing information about the memory mirror manager in a registry to inform the boot process about memory mirroring. For example, "HKLM\System\CurrentControlSet\Control\Session Manager\Memory Management\Mirroring=DWORD 1" may be written in the registry to inform the boot process to enable memory mirroring, such as informing the memory manager to allocate memory for the first, second, and aggregate maps used by the memory mirror manager. In addition, the registry may also contain other information that informs the boot process of other options associated with the memory mirroring process, such as whether verification of mirroring is enabled. The process involved for verification of mirroring is described later below with reference to block 714. The initialization may also allocate the resources associated with the memory mirror manager. In one embodiment, the resources for the memory mirror manager may use four megabytes of nonpaged pool on a system with 64 GB of RAM.

At block 704, the system has been initialized for memory mirroring. The system, through the memory manager, is using the main physical memory subsystem for managing the working sets associated with the one or more applications or system services running on the system. One of the applications 37, such as a management application, may determine that the main physical memory subsystem should be mirrored. This determination may be based on one of several factors, such as the main physical memory subsystem has become defective or a multiple redundant fault tolerant system needs to be synchronized. Once the management application determines that the main physical memory subsystem should be mirrored, the management application initiates the memory mirroring operation. In one illustrative example, the management application initiates the memory mirroring operation by calling NtSetSystemInformation. The NtSetSystemInformation checks whether the management application has the proper privileges, such as SetShutdownPrivlege. If the management application does not have the proper privileges, the memory mirror operation will not be performed. However, assuming the management application has the proper privileges, processing continues at block 705.

At block 705, the resources (i.e., memory, device interfaces) are initialized to begin the memory mirroring operation. Continuing with the example described above, NtSetSystemInformation may call MmCreateMirror in the memory mirror manager. MmCreateMirror creates lists of the memory regions (i.e., pages P in the main physical memory subsystem 25) that are to be mirrored. In addition, MmCreateMirror calls HalStartMirroring in the HAL. HalStartMirroring performs any device dependent initialization. If HalStartMirroring fails, MmCreateMirror aborts and the failure is reported to the management application. However, assuming HalStartMirroring does not fail, processing continues at block 706.

At block 706, the first phase of the memory mirroring process is performed. The first phase of the memory mirroring process, illustrated in FIG. 8 and described in detail below, performs one or more passes. Briefly described, on each pass, the memory mirror manager determines which pages (i.e., memory regions) to copy to the redundant physical memory subsystem. During the first phase, applications are not restricted from accessing the main physical memory subsystem. Thus, the first phase copies the pages to the redundant physical memory subsystem relatively transparently to the running applications. Processing continues at block 708.

At block 708, access to the main physical memory subsystem is restricted. Access may be restricted by restricting access to the PFN database using spinlocks or any other type of synchronization mechanism known to those skilled in the art. Again, using the illustrative example above, the main physical memory subsystem may be restricted by holding a page frame number lock to the PFN database.

At block 710, the second phase of the memory mirroring process is performed. The second phase of the memory mirroring process, briefly described here and illustrated in FIG. 9 and described in detail below, performs one or more passes to copy the pages that the first phase was unable to copy. Typically, the number of pages copied during the second phase is considerably smaller than the number of pages copied during the first phase. Therefore, even though applications are restricted from accessing the first physical memory subsystem during the second phase, the down time is minimal and within an acceptable delay period.

At decision block 712, the first phase and the second phase of the memory mirroring process have completed. The memory mirror manager then determines whether the verification option was selected. As mentioned earlier in the illustrative example above, the verification option may be stored in the registry. For example, HKLM\System\CurrentControlSet\Control\Session Manager\Memory Management\Mirroring=DWORD 3 may be used. If the verification option is enabled, the process continues at block 714, otherwise the process continues at block 716.

At block 714, the memory mirror manager compares the content of the pages copied from the first physical memory subsystem to the content of the corresponding pages on the redundant physical memory subsystem. The memory mirror manager determines which pages to compare by building the aggregate map 500 illustrated in FIG. 5 and described above. If the content of each page contains identical data, the verification is successful and processing continues at block 716. In one embodiment of the verification process, a function named HalMirrorVerify is called. HalMirrorVerify has two parameters, physical_address and NumberOfBytes. Physical_address contains the physical address of the start of a region of physical memory that has been mirrored. NumberOfBytes contains the length (in bytes) of the region that has been mirrored. If the region is in consecutive pages, only one call to HalMirrorVerify is needed. Otherwise, two or more calls are made to HalMirrorVerify to specify non-consecutive pages in the physical memory. In this embodiment, if verification is selected, the HalMirrorVerify is called before calling the function HalEndMirroring during phase two of the memory mirror operation. As will be explained in detail below, HalEndMirroring may accept parameters that specify whether phase one or phase two of the memory mirror process has completed.

At block 716, the access restriction to the main physical memory subsystem is removed. The synchronization mechanism used to restrict access in block 708 is now released and the process ends at ending block 718.

Figure 8:
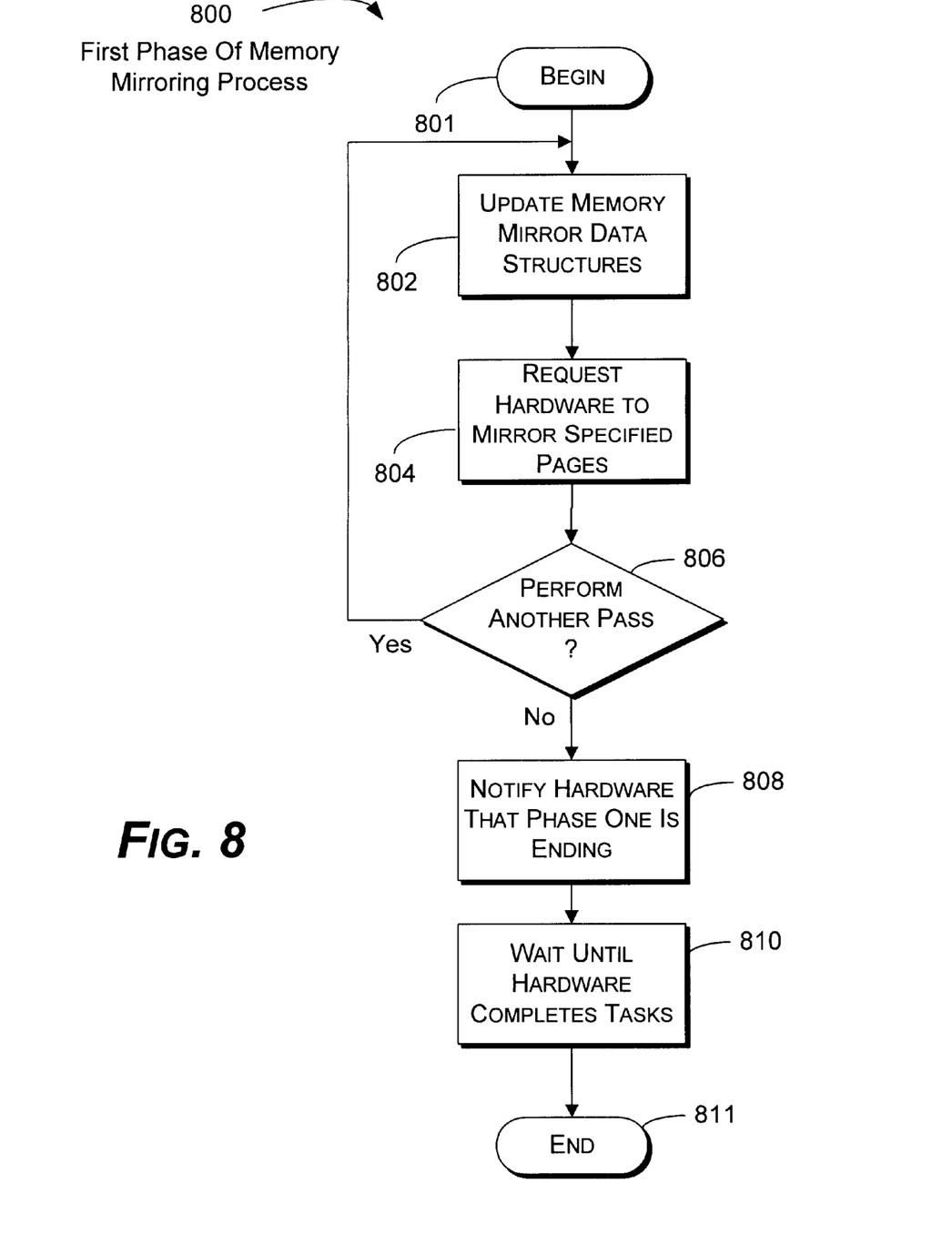
FIG. 8 is a logical flow diagram illustrating a first phase of the process for mirroring memory suitable for use in FIG. 7.

FIG. 8 is a logical flow diagram illustrating one embodiment of the first phase for the memory mirroring process suitable for use in block 706 of FIG. 7. The first phase 800 begins at block 801 after the management application requests a memory mirroring operation.

At block 802, the memory mirror manager and the memory manager begin updating the first and second maps shown in FIG. 4. The memory manager sets any bit $A_{1-N}$ in the first map 410 that corresponds to a page number entry $PN_{1-N}$ that has changed states in the PFN database 300 during one of the passes. For the first pass, the current states in the PFN database 300 are used, and thus, the bits $A_{1-N}$ in the first map are in the same state (i.e., zero, not set), representing no changes (see FIG. 4). The memory mirror manager sets the bits $B_{1-N}$ in the second map 412 for either "copy" (i.e., "1") or "not copy" (i.e., "0"). The bits $B_{1-N}$ are set for "copy" if the corresponding page number entry $PN_{1-N}$ is in the proper state (i.e., standby or modified). On subsequent passes, the first map 410' will most likely have some bits $A_{1-N}$ set, indicating that some pages have changed states (e.g., moving from free to standby). Thus, on subsequent passes, the memory mirror manager will only mark the bits $B'_{1-N}$ as "copy" in the second map 412' if the corresponding bit $A'_{1-N}$ is set in the first map 410' and the corresponding page number entry $PN'_{1-N}$ indicates that the page P is in the proper state (e.g., standby or modified). By checking whether the page has changed since the last pass (e.g., whether the bit corresponding to the page is set in the first map), the first phase ensures that the same page will not be copied if it has already been copied during a previous pass and the page has not changed states.

At block 804, the memory mirror manager sends a request to copy all the pages having corresponding bits B marked as "copy" in the second map. In one illustrative embodiment, the request is achieved by calling a function, HalMirrorPhysicalMemory, for each page having its corresponding bit B marked as "copy". HalMirrorPhysicalMemory accepts two parameters, a PhysicalAddress and a NumberOfBytes. The PhysicalAddress parameter is the physical address of the start of a region of physical memory that is to be copied. The region is aligned on a page boundary. The NumberOfBytes parameter is the length (in bytes) of the region that is to be copied. In one embodiment, the NumberOfBytes may be the page size in bytes (i.e., 4K), so that the HalMirrorPhysicalMemory is called for each page having its corresponding bit B marked as "copy" in the second map 412, shown in FIG. 4. In an alternate embodiment, the memory mirror manager may group adjoining bits B marked as "copy" in the second map 412 (see $B_{12}$ and $B_{13}$ in the second map 412 illustrated in FIG. 4) and set the NumberOfBytes parameter to reflect multiple pages (i.e., 8K in this case since two pages will be copied).

At decision block 806, the memory mirror manager determines whether another pass should be performed. In one embodiment, the memory mirror manager may be configured to perform a predetermined number of passes. In an alternate embodiment, the memory mirror manager may base this determination on the amount of memory that was copied during the current pass. For example, if the pass copied less than a pre-determined threshold (e.g., 1 million bytes), the memory mirror manager may determine to proceed to the second phase of the memory mirror process. If another pass is performed, the process continues back at block 802 and continues as described above. Otherwise, the process continues at block 808.

At block 808, the memory mirror manager notifies the hardware that phase one of the memory mirroring process is ending. In one embodiment, the memory mirror manager may call a function, HalEndMirroring, to signal that phase one is ending. HalEndMirroring accepts one parameter, EndPhaseNumber. The EndPhaseNumber stores a representation for the phase number that has been completed, such as a "0" for phase 1 and a "1" for phase 2. HalEndMirroring informs the hardware to perform any hardware specific tasks necessary for completing the specified phase.

At block 812, the process waits for the hardware to complete the hardware specific tasks. As one skilled in the art of device drivers will appreciate, during block 812, a number of hardware specific tasks may be completed, such as disabling interrupts, processors and other tasks in preparation for the next phase. Typically, the interrupt level is restored to the level before the memory mirroring process began, such as at entry IRQL (APC_LEVEL or DISPATCH_LEVEL). In addition, if the device driver associated with the hardware had waited to physically write some of the pages for some reason, the device driver would finish writing these pages to the redundant memory subsystem at this time. Once the hardware completes any hardware specific tasks, phase one of the memory mirroring process is complete. Processing continues to end block 811.

Figure 9:
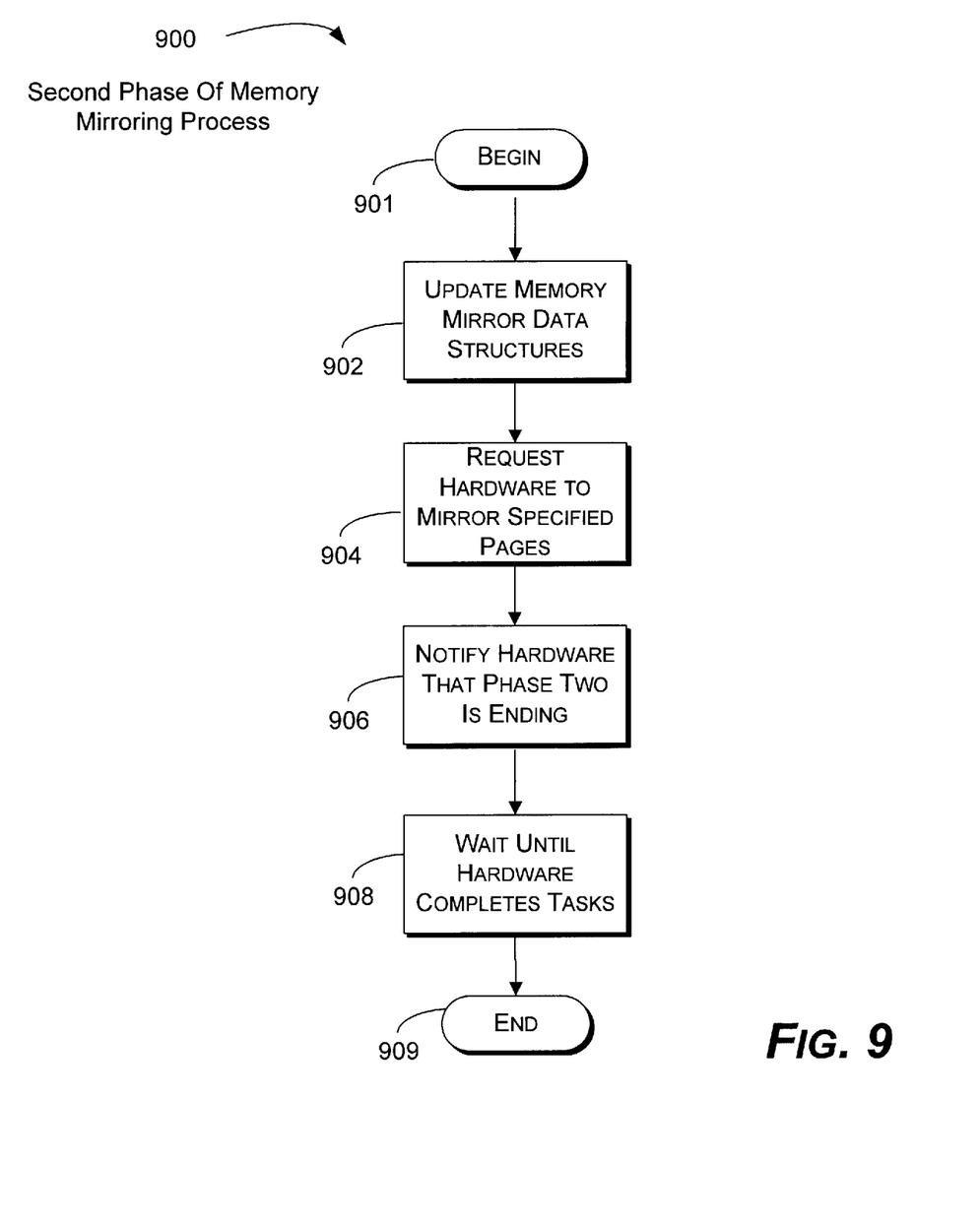
FIG. 9 is a logical flow diagram illustrating a second phase of the process for mirroring memory suitable for use in FIG. 7, in accordance with one embodiment of the present invention.

FIG. 9 is a logical flow diagram illustrating a second phase of the memory mirroring process suitable for use in FIG. 7. The second phase 900 begins at block 901 after the first phase of the memory mirror process has completed and after access to the physical memory subsystem has been restricted. The process continues to block 902.

At block 902, the memory mirror manager updates the second map. The second map used during phase two may be identically structured as the second map used during phase one, a representative second map 412 is illustrated in FIG. 4. Ultimately, the second map during phase two should represent the remaining pages that need to be copied to the redundant physical memory subsystem. To this end, the second map during phase two will have bits $B_{1-N}$ set for the pages P that would have been copied during another pass of phase one, if another pass had occurred. Thus, as described in block 804 of FIG. 8, the memory mirror manager will mark the bits as "copy" in the second map if the corresponding bit is set in the first map and the corresponding page number entry indicates the proper state (i.e., standby or modified), as illustrated in FIG. 4 and described above.

In addition, for the second map associated with phase two, the memory mirror manager will mark bits in the second map that correspond to page number entries having other proper states (i.e., not standby or modified). In one embodiment, the other proper states include the free, zeroed and active states. In an alternative embodiment, more optimized, the other proper states include only active states because the free and zero pages do not contain information that the system or any application needs. In another embodiment, the other proper states only include active pages, but excludes active pages that are used for performing the memory mirroring operation because those active pages are not needed once the memory mirroring operation is completed. For each of these embodiments, the impact of not including pages having certain states should be considered because potential side effects may occur if certain pages are not copied to the redundant memory subsystem. For example, if the system performs a full memory dump after the memory mirroring operation has completed, there may be a comparison error. Once the second map for the second phase has been updated, the process continues to block 904.

At block 904, the memory mirror manager sends a request to copy all the pages having corresponding bits marked as "copy" in the second map, as described in the text above regarding block 806 of FIG. 8.

At block 906, the memory mirror manager notifies the hardware that phase two of the memory mirror process is ending. In one embodiment, the memory mirror manager may call the function HalEndMirroring with the EndPhaseNumber parameter containing a value that specifies the second phase, as described above.

At block 908, the process waits for the hardware to complete the memory mirroring requests and other hardware specific tasks. The tasks performed in block 908 are similar to the tasks performed in block 812 of FIG. 8. In general, for phase two, the HAL is responsible for re-enabling all the system resources, except for interrupts. All the system resources must be re-enabled so that when the memory access restriction is removed (block 716 in FIG. 7), the system will be fully operational. The process then continues to end block 909.

As can be seen from the above description, implementations of the invention make possible the use of redundant physical memory subsystem after a memory mirroring operation. The implementation described above provides a pluggable interface that requires manufacturers to only write a small HAL driver that accommodates their unique hardware design. Thus, if the memory mirror manager, memory manager or other components of the executive change, the HAL driver will be isolated from these changes.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A computer-implemented method for mirroring information, comprising:
   a) performing one or more passes of a first phase, each pass in the first phase including:
      1) copying information from a memory subsystem to a redundant memory subsystem; and
      2) allowing memory access to the memory subsystem during the first phase; and
   b) performing one or more passes of a second phase, each pass of the second phase including:
      1) restricting memory access to the memory subsystem during the second phase;
      2) copying other information from the memory subsystem to the redundant memory subsystem.

2. The computer-implemented method of claim 1, further comprising coordinating with an operating system configured to implement virtual memory during the first and second phase, wherein the operating system views the memory subsystem and the redundant memory subsystem as each having a plurality of pages, categorizes each page into one of a plurality of states, and stores the state of each page in a memory data structure.

3. The computer-implemented method of claim 2, wherein the first phase further includes attempting to re-categorize each page into a proper state for copying before copying information.

4. The computer-implemented method of claim 3, wherein the plurality of states includes a standby state, a modified state, an active state and the proper state includes a standby state and a modified state.

5. The computer-implemented method of claim 1, wherein the number of passes for the first phase is a pre-determined number.

6. The computer-implemented method of claim 1, wherein the number of passes for the first phase is based on a pre-determined amount of information that is copied.

7. The computer-implemented method of claim 6, wherein the pre-determined amount of information is determined based on the information that is copied during one of the completed passes of the first phase.

8. The computer-implemented method of claim 1, wherein copying information includes requesting the copying of multiple pages if the multiple pages are consecutive pages.

9. The computer-implemented method of claim 1, further comprising a verification phase after the first phase and the second phase, the verification phase configured to verify that the memory subsystem and the redundant memory subsystem contain corresponding information and other information such that the redundant memory subsystem operates as the memory subsystem.

10. The computer-implemented method of claim 1, wherein the memory subsystem and the redundant memory subsystem each have a plurality of pages and each pass of the first phase further includes determining the information to copy from the memory subsystem to the redundant memory subsystem based on a state of each page of the memory subsystem, the state of each page of the memory subsystem being stored in a memory data structure.

11. The computer-implemented method of claim 10, wherein the one or more passes of the first phase includes a first pass and one or more subsequent passes and the state includes a proper state for copying, the information to copy during each subsequent pass includes each page that is in the proper state for copying and each page that has changed states during a prior pass.

12. The computer-implemented method of claim 11, wherein a first map identifies each page that has changed states during the prior pass and a second map identifies each page in the proper state for a current pass.

13. A computer-readable medium having computer-executable components, comprising:
   a memory mirror manager configured to manage copying of information resident on a memory subsystem to a redundant memory subsystem, the memory subsystem and the redundant memory subsystem each having a plurality of pages;
   a memory manager configured to implement virtual memory using the memory subsystem by maintaining state information for each page of the memory subsystem, the state information being stored in a memory data structure; and
   an input/output manager configured to receive a request from the memory mirror manager and to perform the copying of the information from the memory subsystem to the redundant memory subsystem, the request specifying the information to copy,
   wherein the memory mirror manager manages the copying of information based on the state information and by performing a first phase during which applications are allowed to access the memory subsystem and a second phase during which applications are restricted from accessing the memory subsystem.

14. The computer-readable medium of claim 13, wherein the input/output manager is configured to interface with a hardware layer that communicates with the memory subsystem and the redundant memory subsystem in such a manner that a change to the memory mirror manager has minimal impact on the hardware layer.

15. The computer-readable medium of claim 13, wherein the request specifies copying multiple pages, the multiple pages being consecutive pages in the memory subsystem.

16. The computer-readable medium of claim 13, wherein the information includes one or more pages of the memory subsystem.

17. The computer-readable medium of claim 13, wherein the memory mirror manager is further configured to verify that the memory subsystem and the redundant memory subsystem contain corresponding information such that the redundant memory subsystem operates as the memory subsystem.

18. A computer-implemented method for mirroring data from a memory subsystem to a redundant memory subsystem, the method comprising:

a) performing a first pass and at least one subsequent pass during a first phase in which an application is allowed access to the memory subsystem, the first phase including:
  1) storing a first phase copy indicator in a plurality of fields of a first data structure if the field of the first data structure corresponds to one out of a plurality of pages on the memory subsystem that is in a proper state for first phase copying;
  2) storing a change indicator in a plurality of fields of a second data structure if the field of the second data structure corresponds to one of the plurality of pages on the memory subsystem that has changed states during a prior pass;
  3) copying the pages that have the first phase copy indicator stored in the corresponding field of the first data structure to the redundant memory subsystem during the first pass and copying the pages that have the first phase copy indicator in the corresponding field of the first data structure and that have the change indicator stored in the corresponding field of the second data structure during each subsequent pass;

b) performing a second phase during which the application is restricted from accessing the memory subsystem, the second phase comprising:
  1) copying the pages that have the first phase copy indicator in the corresponding field of the first data structure and that have the change indicator stored in the corresponding field of the second data structure;
  2) storing a second phase copy indicator in the plurality of fields of the first data structure if the field of the first data structure corresponds to one out of the plurality of pages on the memory subsystem that is in a state other than the proper state for first phase copying; and
  3) copying the pages that have the second phase copy indicator stored in the corresponding field of the first data structure to the redundant memory subsystem.

19. The computer-implemented method of claim 18, wherein copying the pages for the first and second phase includes performing a bulk copy for consecutive pages in the memory subsystem identified by the first and second data structure.

20. The computer-implement method of claim 18, wherein the first and second data structures comprise bit maps and the plurality of fields comprise bit fields.

* * * * *